Sept. 23, 1958  A. J. ORTUSI ET AL  2,853,704
RADIO DIRECTION FINDERS
Filed Nov. 24, 1953
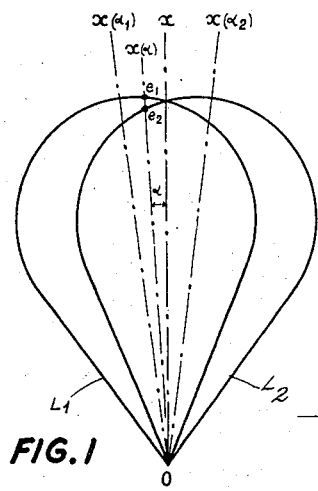
FIG.1
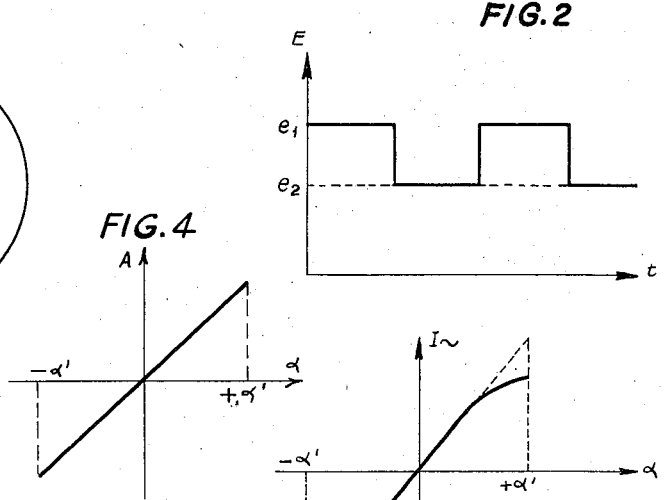
FIG.2
FIG.4
FIG.3
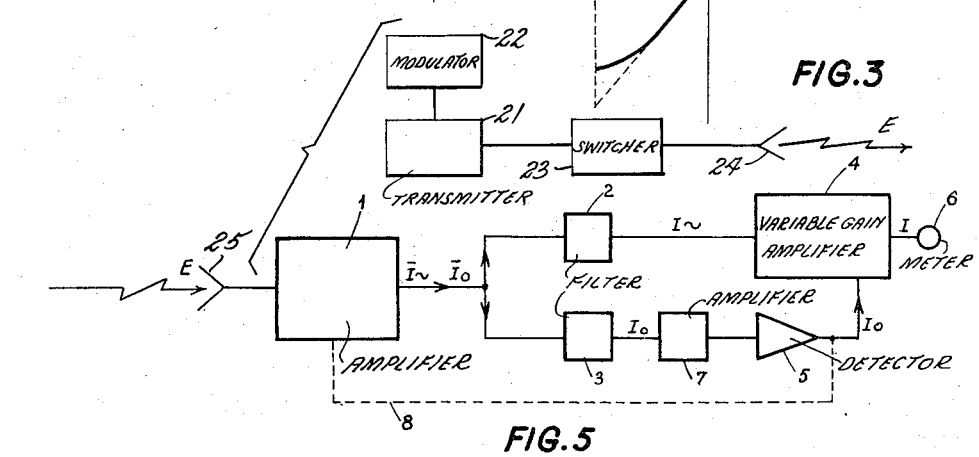
FIG.5
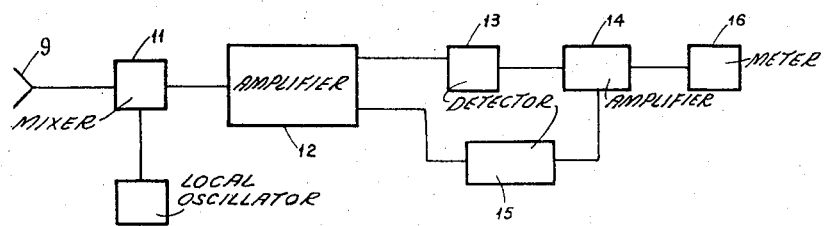
FIG.6

United States Patent Office 2,853,704
Patented Sept. 23, 1958

2,853,704

RADIO DIRECTION FINDERS

Antoine Jean Ortusi and André Robert, Paris, France, assignors to Compagnie Generale de Telegraphie Sans Fil, a corporation of France Application November 24, 1953, Serial No. 394,152

Claims priority, application France November 29, 1952

5 Claims. (Cl. 343—107)

The present invention relates to devices for accurately measuring angles by means of ultra-high-frequency electromagnetic waves and more particularly to devices adapted to determine a direction relative to a point and an axis passing through the latter.

It is known that in this kind of angular measurement, which is carried out by the "double-lobe" process, the radiation pattern, or lobe, of an ultra short wave antenna is mechanically or electronically produced, with a certain recurrence, on either side of a fixed direction, termed the reference axis. These lobes intersect along said axis in the two positions they alternately occupy. In order to determine, with respect to this axis, a direction forming with the latter an angle $\alpha$, the values of the fields in this direction for each one of the two positions of the lobe are compared. This operation practically amounts to measuring an alternating current which is proportional to the difference between these fields. A curve which represents the variation of this current as a function of the angle $\alpha$ is then plotted.

This well-known process presents a serious disadvantage. The linearity of the curve giving the value of the angle $\alpha$ as a function of the field measured, is not perfect; this results in complications.

The object of the invention is to provide a process whereby a curve which is a function of the angle $\alpha$ and is perfectly linear may be obtained. This curve is independent of the power of the transmitter and of the distance between the latter and the point whose position is to be determined.

According to the invention, to obtain this result the measurement of the difference between the fields existing in the considered direction for each one of the positions of the lobes is replaced by the measurement of the ratio between an alternating current, which is proportional to the difference between the received fields, and a direct current, which is proportional to the sum of the received fields.

According to a first mode of carrying out the process of the invention, the transmitter is amplitude modulated at a frequency $$\frac{1}{T_0}$$

which is very small as compared with the lobe switching frequence $$\frac{1}{T}$$

According to another embodiment of the invention there is no modulation of the transmitted wave. Instead, the received signal undergoes an heterodyning and a double detecting as will be described later in more detail.

The invention also has for object to provide a device for carrying out the above-mentioned process.

The invention will be better understood with the aid of the ensuing description and accompanying drawings given by way of example and in which:

Fig. 1 shows the basic diagram of the known double-lobe process;

Fig. 2 shows the form of the current received for the determination of a direction which makes a certain angle with the reference axis;

Fig. 3 shows a curve obtained according to the known double-lobe process, to provide the values of $\alpha$;

Fig. 4 shows a similar curve obtained according to the invention;

Figs. 5 and 6 show block diagrams of two embodiments of the device according to the invention.

The double-lobe system is well known per se and an improvement thereof has been described in a co-pending patent application filed November 17, 1953, Serial No. 392,728 (now abandoned) for "Improved Method and Device for Direction Finding" filed by the applicants.

It is in consequence thought unnecessary to describe in detail how the lobes are produced and switched, and in a general way how the double-lobe process is carried out. It will be merely mentioned here that the determination of a direction relative to a point and to an axis passing through the latter, by means of ultra-high-frequency waves according to the double-lobe method, consists in alternately producing, with a certain recurrence, two radiation patterns which intersect on a straight line or reference axis. According to the conventional method, the amplitudes of the two lobes are identical and constant, as shown diagrammatically in Fig. 1 where the lobes have been distorted for the sake of clarity and where $L_1$ is the first lobe and $L_2$ the second, the straight line $ox$ being the reference axis.

To determine a direction, the signals $e_1$ and $e_2$, which are respectively relative to the two lobes $L_1$ and $L_2$, are compared. For the reference direction $ox$ these fields are equal.

It is furthermore known that this method may be employed with the switching of the lobes being performed either at the emitter or at the receiver.

Fig. 2 shows the form of the signals $e_1$ and $e_2$ on a time basis. It is known that the received A. C. current is of the following form:

$$I = (e_1 - e_2) \cos \frac{2\pi t}{T}$$

T being the lobe switching period.

The curve in full line in Fig. 3 shows the variation of I as a function of the angle $\alpha$. It can be seen that the variation of I as a function of the angle $\alpha$ is substantially linear in the region of $\alpha=0$, but is no longer so when $\alpha$ attains a certain value. It is therefore necessary specially to adjust the measuring apparatus, if the entire length of the curve is to be utilized. It is moreover evident that the shape of this curve varies with the power of the transmitter and the distance between the transmitter and the receiver.

As already mentioned the invention has for object to obtain a curve which is perfectly linear along its entire length and which is independent of the power of the transmitter as well as of the distance between the latter and the point whose position is to be determined.

This result is obtained, according to the invention, by substituting for the curve $I=f(\alpha)$ a curve $A=f(\alpha)$, where A is equal to $$\frac{I}{I_0}$$

$I_0$ being the D. C. component of the signal received. This latter curve is substantially linear (Fig. 4). A simple calculation shows that $$A = \frac{I}{I_0} = \frac{\alpha}{\alpha'} \cos \frac{2\pi}{T} t$$

where $\alpha'$ is the angle between the axis of the lobes and the reference axis $ox$, when the lobes $L_1$ and $L_2$ are symmetrical.

According to the invention a first process for the above ratio A, irrespective whether a pure continuous wave or a pulse modulated wave is transmitted, to amplitude modulate the transmitted wave at a frequency $$\frac{1}{T_0}$$

that is very small compared with the lobe switching frequency $$\frac{1}{T}$$

the frequency $$\frac{1}{T_0}$$

being for instance equal to 20 cycles and the frequency $$\frac{1}{T}$$

to 3,000 cycles.

The received voltage, after a first detection of the carrier wave, is equal to:

$$E \cos\frac{2\pi}{T_0}t$$

where E is the square wave signal represented on Fig. 2. By expansion of this expression into a Fourier series, there are provided the first three terms as follows:

$$V_0 = \frac{e_1 + e_2}{2} \cos \frac{2\pi}{T_0}t$$

$$V_1 = \frac{e_1 + e_2}{4} \cos 2\pi\left(\frac{1}{T} + \frac{1}{T_0}\right)t$$

$$V_2 = \frac{e_1 - e_2}{4} \cos 2\pi\left(\frac{1}{T} - \frac{1}{T_0}\right)t$$

The sum of the voltages $V_1$ and $V_2$ can be written:

$$V_1 + V_2 = V = \frac{e_1 - e_2}{2} \cos \frac{2\pi}{T}t \cos \frac{2\pi}{T_0}t$$

The voltage $V_0$, the frequency of which is much lower than the frequency of the voltages $V_1$ and $V_2$ is filtered in a first filter. The two voltages $V_1$ and $V_2$, the frequency of which is very close to $$\frac{1}{T}$$

can both be filtered in a similar second filter, then amplified in a variable gain amplifier. The other terms of the Fourier series fall out of the frequency band of the two filters, being consequently eliminated. The rectified output voltage from the first filter controls the gain of the amplifier, the output voltage from which provides the ratio A.

A block diagram of one embodiment of the transmitter receiver system for carrying out the above process is shown in Fig. 5. The transmitter system comprises broadly a conventional transmitter 21, a modulator 22, for modulating the transmitter output at the above frequency $$\frac{1}{T_0}$$

and a directive antenna 24 for providing a lobe radiation pattern as shown in Fig. 1. A conventional switching system 23 is also provided for alternately switching the radiated lobe pattern between positions $L_1$ and $L_2$ of Fig. 1. The signal E, transmitted by the transmitter antenna 24 and picked up by the receiver antenna 25, E is amplified by a wide-band amplifier 1 followed by filters 2 and 3 the filter 2 delivering the current I which passes to a variable gain amplifier 4, tuned to the frequency $$\frac{1}{T}$$

as well as to frequencies $$\frac{1}{T} \pm \frac{1}{T_0}$$

This amplifier, known per se, has a coefficient of amplification which is inversely proportional to the variation of a direct voltage. This variation is obtained by means of the voltage $V_0$ provided by the filter 3 and detected by the detector 5. The output current of the amplifier 4, is measured by a suitable measuring device 6 which provides the ratio A and by way of consequence the angle $\alpha$.

In practice it is necessary to incorporate an amplifier 7 tuned to the frequency $$\frac{1}{T_0}$$

between the filter 3 and the detector 5.

Other embodiments, known per se, may also be employed for obtaining the current A which is equal to the ratio $$\frac{I}{I_0}$$

Thus the current $I_0$ may be applied to the amplifier 1 which should be in this case a variable gain amplifier. This connection is shown by a dotted line 8 in Fig. 5. It is also possible to use the current $I_0$ to control the gain of both amplifiers 1 and 4.

According to another embodiment of the invention a continuous wave is transmitted. In this latter case the following device (Fig. 6) is utilized for the reception.

Supposing that the transmitted signal has a frequency of 3000 mc., this signal is when received heterodyned with a local signal, an intermediate frequency signal being thus provided. This intermediate frequency may be for instance of some 30 mc. This signal is amplified and undergoes two detections the first one providing the A. C. current I having the frequency of the lobe switching, for instance 3000 c. The second detection provides the D. C. current $I_0$.

Fig. 6 shows diagrammatically an embodiment of the device which may be used for carrying out the above process.

The transmitted signals are received by means of a suitable receiving device 9 of conventional nature. A local oscillator 10 provides a signal which is mixed with the input signal in a mixer 11 to provide an intermediate frequency signal. The latter is amplified in an amplifier 12. The output of the amplifier 12 is applied to a detector 13 followed by a variable gain amplifier 14. The detector 13 provides the A. C. current I. The output of the amplifier 12 is also applied to another detector 15 which provides the D. C. current $I_0$ which is utilized to vary the gain of the amplifier 14. The output of the amplifier 14 is applied to a measuring device 16 which provides the ratio A.

Of course, other devices may be used to provide the ratio A, the devices of Figs. 5 and 6 having been described by way of example only.

What we claim is:

1. In a system for determining the angular position of a first point with respect to a second point and an axis passing through said second point: means for emitting ultra high frequency energy over a single carrier wave from one of said points; means for alternately concentrating at said second point said energy into two elongated lobe patterns intersecting each other along said axis during successive periods of time; means for continuously switching said energy from one lobe to the other; at the other of said points means: for receiving said ultra high frequency energy; means for measuring the difference between the alternating current energy respectively received from both said lobes; means for measuring the sum of the direct current energy respectively received from both said lobes; and means for establishing the ratio between said difference and said sum.

2. A system according to claim 1 wherein said means for establishing the ratio between said difference and said sum comprise variable gain amplifying means to amplify said difference and means to vary the gain of said variable gain amplifier as a function of said sum.

3. In a system for determining the angular position of a first point with respect to a second point and an axis passing through said second point: means for emitting ultra high frequency energy over a single carrier wave from one of said points; means for modulating said energy at a given frequency; means for alternately concentrating at said second point said energy into two elongated lobe patterns intersecting each other along said axis during successive periods of time; means for continuously switching said energy from one lobe to the other at a frequency substantially higher than said given frequency; at the other of said points; means for receiving said ultra high frequency energy; means for measuring the difference between the alternating current energy respectively received from both said lobes; means for measuring the sum of the direct current energy respectively received from both said lobes; and means for establishing the ratio between said difference and said sum.

4. A system according to claim 3 wherein said means for receiving said ultra high frequency energy, for measuring the difference between the alternating current energy respectively received from both said lobes, for measuring the sum of the direct current energy respectively received from both said lobes, and for establishing the ratio between said difference and said sum comprise: filtering means to filter said A. C. component of the received signal; variable gain amplifying means to amplify said alternating current component; other filtering means to filter said direct current component; means to detect the same; means to utilize said detected direct current component to vary the gain of said variable gain amplifying means; and measuring means to measure the output of said variable gain amplifying means.

5. In a system for determining the angular position of a first point with respect to a second point and an axis passing through said second point: means for emitting continuous ultra high frequency energy over a single carrier wave from one of said points; means for alternately concentrating at said second point said energy into two elongated lobe patterns intersecting each other along said axis during successive periods of time; means for continuously switching said energy from one lobe to the other; at the other of said points means for receiving said ultra high frequency energy; a local oscillator to provide local oscillations; mixing means to heterodyne said continuous energy and said local oscillations to provide intermediate frequency oscillations; amplifying means to amplify said intermediate frequency oscillations; first detecting means to detect said amplified oscillations to provide the alternating current component of said oscillations; variable gain amplifying means to amplify said detected alternating current oscillations; other detecting means to detect the direct current component of said intermediate frequency oscillations; means to vary the gain of said variable gain amplifying means by means of said detected direct current component; and measuring means to measure the output of said variable gain oscillating means.

References Cited in the file of this patent

UNITED STATES PATENTS

| | | |
|---|---|---|
| 1,435,941 | Robinson | Nov. 21, 1922 |
| 2,051,966 | Runge | Aug. 25, 1936 |
| 2,279,031 | Cockerell et al. | Apr. 7, 1942 |
| 2,456,666 | Agate et al. | Dec. 21, 1948 |
| 2,509,207 | Busignies | May 30, 1950 |